July 2, 1957
M. MICHALSKI
2,797,852
VEHICLE ATTACHMENT
Filed Jan. 30, 1956
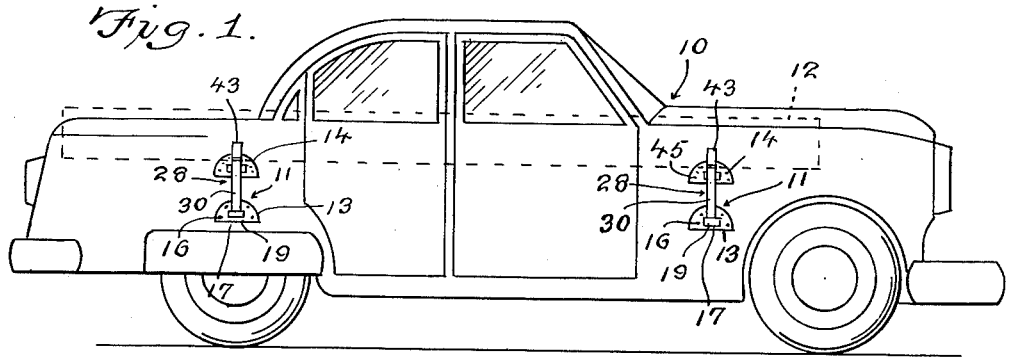
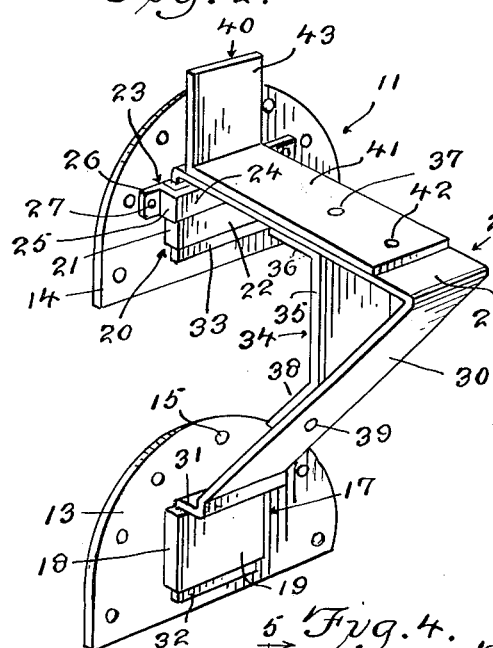
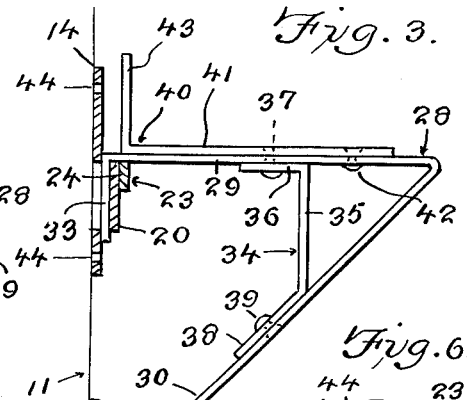
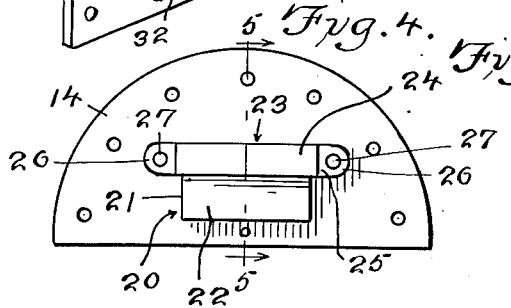
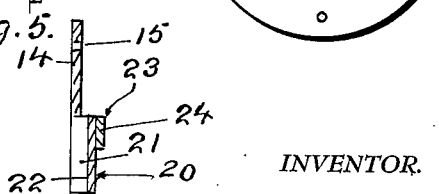
INVENTOR.
Martin Michalski
BY *Victor J. Evans & Co.*
ATTORNEYS

United States Patent Office 2,797,852
Patented July 2, 1957

2,797,852

VEHICLE ATTACHMENT

Martin Michalski, North Chicago, Ill.

Application January 30, 1956, Serial No. 562,178

2 Claims. (Cl. 224—42.45)

This invention relates to a vehicle such as an automobile, and more particularly to a mechanism for attachment to a vehicle whereby long objects or loads can be readily carried.

The object of the invention is to provide a mechanism which will permit long objects such as ladders, poles, or the like to be readily transported or carried by automobiles or other vehicles.

Another object of the invention is to provide an assembly for attachment to a vehicle such as an automobile, whereby long objects such as lumber, pipes, or the like can be supported at one side of the vehicle, and wherein the present invention includes brackets which can be detached when the device is not being used.

A further object of the invention is to provide a vehicle attachment which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view illustrating a vehicle having the mechanism of the present invention attached thereto.

Figure 2 is a perspective view of the mechanism of the present invention.

Figure 3 is a vertical sectional view taken through one of the supporting devices.

Figure 4 is an elevational view of the top plate.

Figure 5 is a sectional view taken on the line 5—5 of Figure 4.

Figure 6 is an elevational view of a modified upper plate.

Referring in detail to the drawings, the numeral 10 designates a conventional vehicle such as an automobile, and the present invention is directed to attachments 11 which are adapted to be secured to one side of the automobile 10 whereby long loads 12 can be readily transported or carried. The attachment of the present invention includes lower and upper plates 13 and 14, and a pair of these plates are arranged contiguous to the front of the vehicle, while a similar pair of plates is arranged contiguous to the rear of the vehicle. The lower plate 13 is provided with a plurality of spaced apart apertures or openings 15 whereby suitable securing elements such as screws or rivets 16 can be extended through the apertures 15 for securing the pipe 13 to the side of the vehicle.

The lower plate 13 is provided with a U-shaped struck-out portion 17 which includes a pair of spaced parallel side walls 18 and a web or connecting portion 19, Figure 2.

Each of the upper plates 14 is provided with a U-shaped portion 20 which may be struck-out from the plates 14 and each U-shaped portion 20 includes spaced parallel side walls 21 and a web or connecting portion 22. There is further provided a brace 23 which includes a first section 24 which is arranged contiguous to the outer surface of the web 22, and the brace 23 further includes second sections 25 which are arranged at right angles with respect to the first section 24. Arranged at right angles with respect to the second section 25 are third sections 26, and suitable securing elements 27 extend through the third sections 26 and into engagement with the plates 14.

There is further provided brackets 28 which each include a horizontally disposed upper support portion 29 and inclined body portions 30. The lower end of each of the body portions 30 terminates in a horizontally disposed shoulder 31, and depending from the shoulder 31 is a vertically disposed tongue 32 which extends through the struck-out portion 17 on the plate 13. A vertically disposed tongue 33 depends from the support portion 29, and the tongue 33 extends through the struck-out portion 20 on the upper plate 14.

For reinforcing each bracket 28, a brace 34 is provided, and the brace 34 includes a vertically disposed portion 35 which has a horizontally disposed portion 36 on its upper end. The portion 36 may be secured to the top of the bracket by means of a securing element 37. An inclined portion 38 is arranged on the bottom of the brace 34, and the inclined portion 38 may be secured to the body portion 30 by means of a securing element 39.

Each of the brackets 28 has secured thereto an L-shaped support element 40 and each support element 40 includes a horizontally disposed arm 41 which may be secured to the support portion 29 by means of the securing element 37 and by means of a securing element 42. Extending upwardly from each of the arms 41 is a vertically disposed leg 43. The pair of legs 43 are adapted to coact to retain the load 12 in its proper position contiguous to the side of the vehicle.

The upper plate 14 is provided with a plurality of apertures 44 whereby suitable securing elements 45 can be extended through these apertures for securing the upper plates into the vehicle.

Referring to Figure 6 of the drawing, there is shown a modified plate such as an upper plate which is indicated by the numeral 14', and the plate 14' may have a circular shape instead of a semi-circular shape as shown in Figures 1 through 5. Otherwise, the construction and function of these plates shown in Figure 6 is the same as that shown in Figures 1 through 5.

From the foregoing, it is apparent that there has been provided a mechanism for attachment to a vehicle such as the automobile 10 whereby long loads 12 can be readily transported. In use, two pairs of the plates are secured to the side of the vehicle as shown in Figure 1. Then, the load 12 is arranged or interposed between legs 43 and the top portion of the plates 14 so that the load will be maintained in its proper position whereby it can be readily transported to any desired location. The plates 13 and 14 are secured to the side of the vehicle permanently if desired. However, the brackets 28 can be readily detached from the plates by lifting up the brackets 28 so that these brackets 28 can be carried within the vehicle when a load is not being transported.

The brace 34 helps to reinforce the bracket, and the tongues 33 and 32 are removably mounted in the U-shaped struck-out portions as previously described. The brace 23 helps reinforce the upper struck-out portion 20.

The parts can be made of any suitable material as for example the parts may be made of stainless steel. The device can be made in various shapes and sizes. When the brackets 29 are not being used, they may be stored under the seat of the vehicle or in the trunk. Braces are provided for reinforcing the parts wherever the load is the heaviest. A pair of the plates are arranged adjacent the front portion of the vehicle and a pair of the plates are arranged adjacent the rear portion of the vehicle. As shown in Figure 6, the plates can have a circular shape. If desired suitable cables or ropes can be used for helping to anchor or secure the load in place on the mechanism.

I claim:

1. In a mechanism for attachment to a vehicle, upper and lower spaced apart plates arranged one above the other, there being a plurality of spaced apart apertures in each of said plates, said lower plate being provided with a U-shaped struck-out portion including spaced parallel side walls and a web extending between said side walls, said upper plate being provided with a U-shaped struck-out portion defining a pair of spaced parallel side walls and a web extending between said last named side walls, a brace including a first section arranged contiguous to the outer surface of the web of said upper plate, said brace further including second sections arranged at right angles to said first section and arranged contiguous to the outer surface of the side walls of the struck-out portion, third sections extending at right angles to said second section and secured to said plate, a bracket including a horizontally disposed support portion, a tongue depending from said support portion and projecting down through the struck-out portion of said upper plate, an inclined body portion depending from said support portion, a horizontally disposed shoulder extending from the lower end of said body portion and said shoulder terminating in a vertically disposed tongue projecting through the struck-out portion on said lower plate, a brace including a vertically disposed portion extending between said body portion and said support portion, a horizontally disposed portion on the upper end of said vertically disposed portion of said last named brace and said last named horizontally disposed portion being secured to the under surface of said support portion, an inclined portion on the lower end of said vertically disposed portion of said last named brace and said inclined portion being secured to the upper surface of said inclined body portion.

2. In a mechanism for attachment to a vehicle, upper and lower spaced apart plates arranged one above the other, there being a plurality of spaced apart apertures in each of said plates, said lower plate being provided with a U-shaped struck-out portion including spaced parallel side walls and a web extending between said side walls, said upper plate being provided with a U-shaped struck-out portion defining a pair of spaced parallel side walls and a web extending between said last named side walls, a brace including a first section arranged contiguous to the outer surface of the web of said upper plate, said brace further including second sections arranged at right angles to said first section and arranged contiguous to the outer surface of the side walls of the struck-out portion, third sections extending at right angles to said second section and secured to said plate, a bracket including a horizontally disposed support portion, a tongue depending from said support portion and projecting down through the struck-out portion of said upper plate, an inclined body portion depending from said support portion, a horizontally disposed shoulder extending from the lower end of said body portion and said shoulder terminating in a vertically disposed tongue projecting through the struck-out portion on said lower plate, a brace including a vertically disposed portion extending between said body portion and said support portion, a horizontally disposed portion on the upper end of said vertically disposed portion of said last named brace and said last named horizontally disposed portion being secured to the under surface of said support portion, an inclined portion on the lower end of said vertically disposed portion of said last named brace and said inclined portion being secured to the upper surface of said inclined body portion, and an L-shaped support element including a horizontally disposed arm secured to the upper surface of said support portion, and a vertically disposed leg extending upwardly from an end of said arm.

References Cited in the file of this patent
UNITED STATES PATENTS

| 541,323 | Gewiss | June 18, 1895 |
| 2,233,273 | Di Vincenzo | Feb. 25, 1941 |
| 2,425,629 | Mayer | Aug. 12, 1947 |

FOREIGN PATENTS

| 566,891 | Great Britain | Jan. 18, 1945 |